United States Patent Office 3,531,497
Patented Sept. 29, 1970

---

3,531,497
2,4,5 - TRIPHENYL - (AND SUBSTITUTED TRIPHENYL) - 3 - ACETONITRILES OF PYRROLE
Gilbert A. Youngdale, Portage, Mich., assignor to The Upjohn Company, Kalamazoo, Mich., a corporation of Delaware
No Drawing. Filed Feb. 21, 1967, Ser. No. 617,490
Int. Cl. C07d 5/16, 27/22, 27/26
U.S. Cl. 260—326.5                                5 Claims

ABSTRACT OF THE DISCLOSURE

New 2,4,5-triphenyl-(and substituted triphenyl)-3-acetonitriles of pyrrole have use as topical, oral and injectable anti-inflammatory and analgesic agents for the treatment of allergic and rheumatic conditions of mammals and birds. These compounds can be prepared by several methods, e.g., (1) treating the corresponding 2,4,5-triphenyl-(and substituted triphenyl)-pyrroles with formaldehyde or acetaldehyde and a secondary amine; treating the thus-obtained tertiary amine with an alkyl halide and the thus-obtained quaternary ammonium halide with sodium cyanide; or (2) treating the corresponding 2,4,5-triphenyl-(and substituted triphenyl)-pyrroles with formaldehyde and hydrogen bromide or chloride and then with sodium cyanide.

BACKGROUND OF THE INVENTION

Field of the invention

This invention relates to novel organic compounds and more particularly to anti-inflammatory, analgesic 2,4,5-triphenyl-(and substituted triphenyl)-3-cyanoalkyl-pyrroles, -furans and -thiophenes, intermediates therefor and a process of production thereof.

Description of the prior art

The German Pat. 1,105,714 shows aryl-substituted pyrroles, furans and thiophenes; however, no compounds have a 3-cyanomethyl or 3-cyanoethyl group. Moreover, the compounds of the German Pat. 1,105,714 were used for electrophotographic reproduction processes.

SUMMARY OF THE INVENTION

The novel products can be illustratively represented by the following formula:

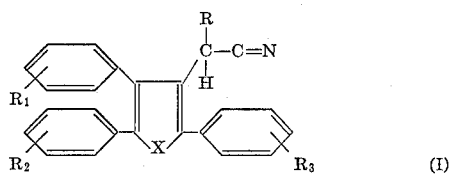

(I)

wherein X is selected from the group consisting of $>O$, $>S$, and $>N-R_0$ in which $R_0$ is selected from the group consisting of hydrogen and methyl; wherein $R_1$, $R_2$ and $R_3$ are selected from the group consisting of hydrogen, alkyl and alkoxy having from 1 to 4 carbon atoms, inclusive, halogen and $-CF_3$; and wherein R is defined as $R_0$, with the proviso that when X is $>O$ or $>S$, R is hydrogen.

One method (1) of the invention comprises: treating a starting compound of the Formula II:

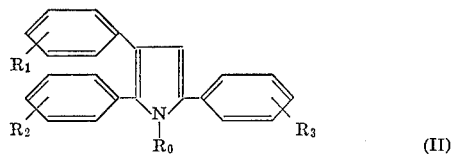

(II)

wherein $R_0$, $R_1$, $R_2$, $R_3$ are defined as above, with formaldehyde or acetaldehyde and a dialkylamine, preferably dimethylamine, to give the compound of Formula III:

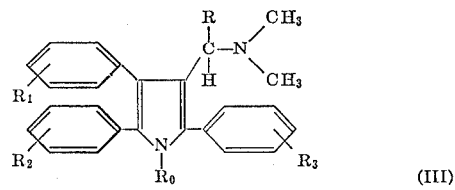

(III)

wherein $R_0$, R, $R_1$, $R_2$ and $R_3$ are defined as above, converting III with alkyl halide to the corresponding quaternary ammonium halide and treating this product with an alkali metal cyanide, e.g., sodium or potassium cyanide, to obtain a compound of Formula I wherein X is $>N-R_0$.

Another method (2) of this invention comprises: treating a starting material of the Formula IIa:

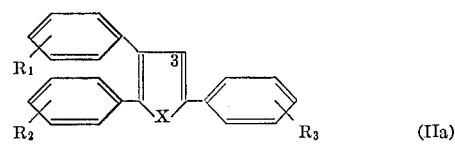

(IIa)

wherein $R_1$, $R_2$, $R_3$ and X are defined as hereinabove, with formaldehyde and HY in which Y is selected from the group consisting of chlorine and bromine to give the 3-halomethyl derivative of the compound IIa, and treating this product with an alkali metal cyanide, e.g., sodium or potassium cyanide, to give a compound of Formula I wherein R is hydrogen.

Other methods include:

(3) Brominating a compound of the formula:

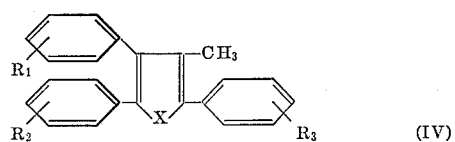

(IV)

wherein $R_1$, $R_2$, $R_3$ and X are defined as above, with N-bromo-succinimide at the 3-methyl group, and treating the brominated product with an alkali metal cyanide, e.g., sodium or potassium cyanide, to obtain a compound of Formula I wherein R is hydrogen;

(4) Treating a compound of the Formula V:

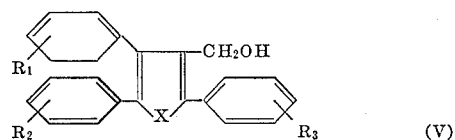

(V)

with a chlorinating agent, e.g., thionyl chloride of phosphorus pentachloride, to give the 3-chloromethyl derivative of compound IIa, and treating the latter with an alkali metal cyanide, e.g., sodium or potassium cyanide, to obtain a compound of Formula I wherein R is hydrogen.

The alcohol of Formula V above can be prepared by reacting, e.g., a compound of Formula IIa with bromine to give the 3-bromo derivative of IIa, then with magnesium to form the corresponding Grignard and finally reacting the Grignard with formaldehyde. Other processes and variations of the above processes can be used to make the novel compounds of Formula I above.

DESCRIPTION OF THE PREFERRED EMBODIMENTS

The alkyl groups herein used, having from 1 to 4 carbon atoms, inclusive, are illustratively methyl, ethyl, propyl, butyl, isobutyl, secondary butyl, and the like.

The alkoxy groups herein used having from 1 to 4 carbon atoms, inclusive, are methoxy, ethoxy, propoxy, isopropoxy, butoxy, secondary butoxy, isobutoxy, and the like.

The halogens herein used are fluorine chlorine, bromine and iodine.

The Formula I compounds of the present invention are anti-inflammatory, analgesic and antipyretic agents useful in birds and mammals. The compounds are useful topically, orally and parenterally for the relief of rheumatic, allergic, dermatological and ocular disorders generally responsive to anti-inflammatory agents, and for the relief of pain and fever.

More specifically, the compounds of the present invention are useful for the reduction of swelling in gouty arthritis, rheumatoid arthritis, rheumatoid spondylitis, osteoarthritis, psoriatic arthritis, acute superficial thrombophlebitis and painful shoulder syndromes such as peritendinitis, capsulitis, bursitis, acute shoulder arthritis as well as contact dermatitis, atopic dermatitis, neurodermatitis, anogenital pruritus, seborrheic dermatitis, and the like, and for the relief of pain and fever.

The novel compounds also find application in the local treatment of inflammatory conditions in animal mastitis, a disease of the mammary glands which can be of particular concern in milk-producing animals such as cows.

The compounds of the present invention in the treatment of inflammatory conditions compare more than favorably with phenylbutazone, an accepted non-steroid employed in the treatment of gout, rheumatoid arthritis, ankylosing spondylitis and other inflammatory conditions. Thus, e.g., in the hind paw edema assay utilizing both intact and adrenalectomized rats 4,5-bis-(p-methoxyphenyl)-2-phenylpyrrole-3-acetonitrile in polyoxyethylene sorbitan mono-oleate (polysorbate 80) is about 6 to 13 times as active as phenylbutazone.

In the hind paw edema assay, male rats, intact or adrenal-ectomized, weighing about 160–200 grams are fasted for about 14 hours. Animals (5 per group) are dosed orally with 1.0 ml. of a suspension of the test compound prepared in polysorbate 80 or with 1.0 ml. of a solution in dimethyl sulfoxide vehicle one hour prior to injection of 0.1 ml. of 0.5% aqueous carrageenin into the right hind paw. The left hind paw serves as a control. Five hours after carrageenin injection both paws are amputated and weighed. The ability of compounds to inhibit carrageen in-induced edema is considered to be of value in determining efficacy of potential anti-inflammatory therapeutic agents.

The compounds have advantageously shown no indication of inducing ulcer or ulcer bleeding in contrast to phenylbutazone or other presently employed anti-inflammatory agents.

The pharmaceutical forms contemplated by this invention include pharmaceutical compositions suited for topical, oral, parenteral and rectal use.

The term "unit dosage form" as used herein refers to physically discrete units suitable as unitary dosages, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved and (b) the limitations inherent in the art of compounding such an active material for therapeutic use. Examples of suitable unit dosage forms, as herein described, are tablets, capsules, pills, powder packets, wafers, cachets, granules, solutions or suspensions for oral or sterile injectable use, suppositories, and segregated multiples of any of the foregoing, and other forms alluded to herein.

The term "topical" as employed herein relates to the use of the medication, incorporated in a suitable base or vehicle, at the site of the inflammation for exertion of local action. Accordingly, such topical compositions include those pharmaceutical forms in which the medication is applied externally by direct contact with the surface to be treated. Conventional pharmaceutical forms for this purpose include ointments, lotions, pastes, jellies, sprays, powders, and the like. The term "ointment" embraces formulations (including creams) having oleaginous, absorption, water-soluble and emulsion-type bases, e.g., petrolatum, lanolin, polyethylene glycols, as well as mixtures of these. Topical compositions as herein defined also include those pharmaceutical forms which afford local as opposed to systemic release into the immediately affected areas where such areas are not accessible for direct external application, such forms being sprays (e.g., for oral or nasal use), aerosols (e.g., for deeper penetration than is usually afforded by a spray), drops (e.g., for use in the eyes and ears), suppositories (e.g., for rectal or vaginal use), and powders (e.g., for insufflation).

The oral dosage forms include both solid and liquid. Solid unit dosage forms can be in the form of tablets, coated or uncoated; capsules, hard or soft; powders; granules; pills, and the like. Suitable diluents or carriers for such compositions include lipids, carbohydrates, proteins and mineral solids.

The tablets for oral use contain the active ingredient in the required amount with pharmaceutical diluents or excipients, binders, disintegrators, and lubricants. The active ingredient is suitably comminuted with a carbohydrate diluent (e.g., lactose), a mineral solid (e.g., calcium sulfate and dicalcium phosphate), and the like, to form the basic powder mixture. The said mixture can be granulated by wetting with a protein binder such as gelatin solution, or a carbohydrate such as acacia mucilage and corn syrup, and is then screened to desired particle sizes.

The capsules for oral use can comprise a mixture of the active ingredient in combination with a pharmaceutical diluent and a gelatin sheath enclosing said mixture. The capsules can be in the form of soft capsules enclosing the active ingredient in the required amount, e.g., soft elastic capsules can be filled with the drug in solution or suspension in oil, oil-organic solvent, polysorbate 80 or polysorbate 80-oil mixture. Hard capsules can also be prepared comprising mineral solids (e.g., talc or calcium sulfate) and, optionally, lubricants (e.g., calcium or magnesium stearate) with the required amount of the drug.

The powders for oral use are conveniently prepared by comminuting the active ingredient and mixing with an acceptable diluent (e.g., an edible carbohydrate such as lactose) and advantageously include sweetening and flavoring agents (such as sugar, saccarin, a cyclamate salt or flavoring oil).

Pills for oral use include the required amount of the active ingredient plus suitable diluents, binders, disintegrators and lubricants as heretobefore set forth with respect to tablets and capsules. The pills are suitably prepared by the rolling technique or other known methods, advantageously with the use of the aforesaid lubricants.

For the treatment of domestic birds and mammals by oral administration, the therapeutic ingredient is conveniently prepared in the form of a food premix. The food premix can comprise the active ingredient in admixture with an edible diluent such as starch, oatmeal, flour, calcium carbonate, talc, dried fish meal and like nontoxic, orally-acceptable diluents. The prepared premix is then conveniently added to the regular feed, thereby supplying the included medication to the animal or bird in the course of feeding.

The liquid compositions for oral use can be in the form of suspensions, emulsions, or solutions, in aqueous and nonaqueous vehicles such as edible vegetable oils.

The emulsions are preferably of the oil-in-water type and contain the active ingredient in the required amount with acceptable emulsifying agents, such as gum acacia, gum tragacanth, naturally-occurring phosphatides, and the like. Suitable sweetening, coloring, and flavoring agents are added to the aqueous phase of the emulsion. Under ordinary conditions of storage and use, the emulsions are kept free from microorganism growth by the addition of a preservative, such as methylparaben and propylparaben.

Solutions for oral use of the active ingredient can be prepared in an edible vegetable oil such as in corn oil, cotton seed oil, peanut oil, coconut oil, sesame oil, safflower oil, and the like. To increase the amount of active material dissolved in the oil, the drug can be dissolved first in about 5 to 25% of an oral, pharmaceutically acceptable organic solvent such as N,N-dimethylacetamide, dimethyl sulfoxide or 2,2-dimethyl-4-carbinol-1,3-dioxolane. Antioxidants can be added. Alternatively, solutions can be prepared in any of the above organic solvents or mixtures of these. Sweetening, coloring, and flavoring agents are added to assure patient acceptance.

Suspensions for oral use are conveniently prepared in water and aqueous solutions of orally acceptable liquids, such as ethanol, glycerol, sorbitol, propylene glycol and polyethylene glycols. The active ingredient is normally comminuted to a fine particle size for use in the suspensions, which can also contain soluble suspending agents, such as sodium carboxy-methylcellulose, methylcellulose, acacia, tragacanth, polyvinyl-pyrrolidone, polyvinyl alcohol, and the like. As with the other liquid oral compositions, preservatives, coloring agents, sucrose and other sweeteners, and flavoring agents are added for convenience in storage and use.

The parenteral dosage forms of the present invention for intramuscular, subcutaneous, intra-articular and intrabursal use include sterile solutions and suspensions, and sterile powders for the extemporaneous preparation of sterile injectables. In the case of sterile suspensions and powders, it is preferred that the active ingredients be of fine particle size, of about 10 microns or less and preferably, less than 1 micron. The solvent or suspending liquid comprises water, vegetable oils, organic solvents, e.g., glycerol, propylene glycol, liquid polyethylene glycol, dimethyl sulfoxide, N,N-dimethylacetamide, 2,2-dimethyl-4-carbinol-1,3-dioxolane, isopropyl myristate, polysorbate 80, ethanol, benzyl alcohol, benzyl benzoate, and the like, or suitable mixtures thereof.

In the preparation of sterile powders for use in sterile injectables, the preferred method involves freeze-drying of a previously sterilized solution of the active ingredient plus any additional desired soluble ingredients to obtain a sterile, dry product. Powers for injectable suspensions are preferably sterilized by the use of a gas, such as ethylene oxide, after blending with the required additional ingredients in the proper particle size. Just prior to use, the sterile powder is reconstituted in the desired sterile suspending liquid.

The daily dosage of 4,5-bis(p-methoxyphenyl)-2-phenylpyrrols-3-acetonitrile dispersed in a pharmaceutically and physiologically acceptable carrier ranges from about 0.1 to about 20 mg. per kg. of animal. Similar dosages can be used for other Formula I 2,4,5-triphenyl(and substituted triphenyl)-3-acetonitriles of pyrrole, furan and thiophene.

The starting materials of this invention which can all be represented by Formula IIa are phenyl and substituted phenyl pyrroles, furans and thiophenes. Many of the compounds are known, others herein used are prepared as shown in the examples.

In carrying out the method (1) of this invention a starting triphenyl or substituted triphenyl pyrrole of Formula II is treated with dimethylamine and formaldehyde or acetaldehyde in an organic solvent such as acetic acid, propionic acid, tetrahydrofuran or the like, to give the corresponding 2,4,5-triphenyl-3-dimethylaminomethyl or -ethyl-pyrrole of Formula III. The reaction mixture is generally heated to a temperature between 50° to 150° C. for a short period, 5 to 60 minutes. The resulting product of Formula III is recovered by standard procedures such as extraction (the impurities are extracted with water-insoluble solvents such as ether, chloroform, methylene chloride and the like) and the water-soluble products of Formula III in salt form are then basified and extracted as free amines with organic, water-immiscible solvents such as methylene chloride, ether, toluene, benzene or the like. After evaporation of the solvent the product is obtained which can be purified by recrystallization from Skellysolve B hexanes, methanol, ethanol or the like.

The thus-obtained product of Formula III is thereupon treated with methyl iodide or bromide to furnish the corresponding methiodide or methobromide of 2,4,5-triphenyl-3-[(dimethylamino)alkyl]pyrrole. The addition reaction with methyl iodide or bromide is generally carried out in tetrahydrofuran and the product which separates is recovered by filtration and recrystallized from ether, dimethylformamide, methylene chloride or the like to provide the corresponding purified methiodide or methobromide of the 2,4,5-triphenyl-3-[(dimethylamino)alkyl] pyrrole.

The thus obtained methiodide or methobromide of the product of Formula III is thereupon reacted with sodium or potassium cyanide in excess. This reaction is preferably carried out with an excess of the sodium cyanide in a solvent such as dimethylformamide, preferably at reflux temperature for periods of from 30 minutes to 6 hours. The product is thereupon isolated by diluting the reaction mixture with water and extracting with water-immiscible solvents such as ether, methylene chloride, chloroform, Skellysolve B hexanes, mixtures of pentanes, and the like, and evaporating the solvent. The thus-obtained crude products of Formula I wherein X is >N—R$_0$ are generally purified by crystallization and recrystallization from solvents such as acetone, Skellysolve B hexanes, methanol and the like.

In the second method a triaryl substituted pyrrole, -furan or -thiophene of Formula IIa is first chloromethylated in an organic solvent. Solvents useful for this purpose are particularly chloroform, methylene chloride, carbon tetrachloride, ethylene dichloride and other chlorohydrocarbons. Instead of aqueous formaldehyde, solid paraformaldehyde is used usually in an excess slightly above that required by stoichiometric proportions. In the preferred embodiment of this invention the starting material of Formula IIa is dissolved in chloroform, paraformaldehyde is added and a catalyst such as zinc chloride or aluminum chloride in a quantity between equal and half that of paraformaldehyde is added. The mixture is then cooled to a temperature between zero and 10° C. and hydrogen chloride gas is allowed to pass through the reaction mixture. After adding the hydrogen chloride gas for 10 to 60 minutes, the mixture is concentrated to dryness to obtain the corresponding 3-chloromethyl derivative of the starting compound of Formula IIa.

The thus obtained 3-chloromethyl derivative is treated in an alcoholic solution such as methanol, ethanol, propanol and isopropanol with a solution of potassium cyanide or sodium cyanide. The potassium or sodium cyanide can be dissolved in water or methanol. After all of the cyanide solution is added the mixture is heated to 40° C. for a period of 2 to 12 hours, then allowed to cool to room temperature, whereupon water is added to precipitate the thus produced acetonitrile. The precipitate is recovered by filtration, and crystallized and recrystallized from organic solvents such as acetonitrile, methanol, ethanol, Skellysolve B hexanes or the like, to provide the pure products of Formula I wherein R is hydrogen. The following examples are illustrative of the products and processes of the present invention.

EXAMPLE 1

4,5-bis(p-methoxyphenyl)-2-phenylpyrrole-3-acetonitrile (a) Ethyl 4,5-bis(p-methoxyphenyl)-2-phenylpyrrole-3-carboxylate:

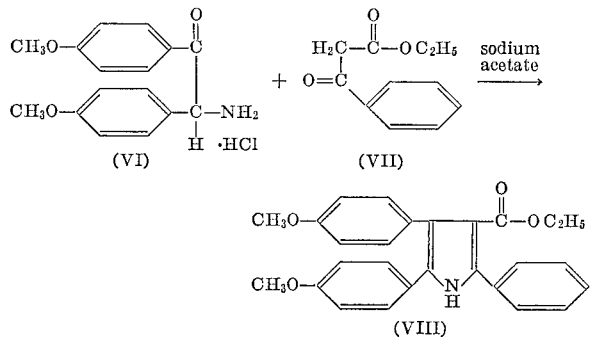

A mixture of 19.2 g. (0.1 mole) of ethylene benzoylacetate (VII), 30.8 g. (0.1 mole) of 2-amino-4'-methoxy-2-(p-methoxyphenyl)acetophenone hydrochloride (VI), 9 g. (0.11 mole) of anhydrous sodium acetate, and 100 ml. of 75% acetic acid was refluxed for 3 days. The solution was thereupon diluted with 150 ml. of water and extracted with ether. The ether extracts were separated, washed with water, then with aqueous dilute sodium carbonate until neutral, and then with water again, dried over anhydrous magnesium sulfate and evaporated. A red oil was obtained. The red oil was chromatographed over 2200 g. of Florisil anhydrous magnesium silicate using first methylene chloride and then acetone as the eluant. Only the acetone fractions contained the product. The combined acetone fractions were evaporated to give 27.7 g. of a red oil, and 5.4 g. of oil which partially solidified. The 27.7 g. of oil were thereupon chromatographed over 2000 g. of silica gel employing 200 ml. fractions. Fractions 1 through 48 with methylene chloride contained no product. Fractions 49 to 53 (1% acetone-99% methylene chloride) contained 0.98 g. of anisil but not the desired product. Fractions 54 through 77 were taken with 5% acetone-95% methylene chloride. The product was found in fractions 55 through 69. Fractions 55 through 69 were thereupon combined and evaporated to give an oil which was dissolved in acetone and evaporated in vacuo to give 10.5 g. of glass-like ethyl 4,5-bis(p-methoxyphenyl)-2-phenylpyrrole-3-carboxylate.

Ultraviolet: $\lambda_{max}$. 228 (24,200); sh. 240 (22,650); 295 (21,600).

Analysis.—Calcd. for $C_{27}H_{25}NO_4$ (percent): C, 75.86; H, 5.90; N, 3.28. Found (percent): C, 75.78; H, 6.28; N, 3.16.

(b) 2,3-bis(p-methoxyphenyl)-5-phenylpyrrole: A mixture of 5.9 g. of ethyl 4,5-bis(p-methoxyphenyl)-2-phenylpyrrole-3-carboxylate, 30 ml. of aqueous 50% sodium hydroxide and 100 ml. of methanol was refluxed for 3 days. The reaction mixture was then evaporated, the residue was diluted with water and extracted with ether. The ether extract was dried over anhydrous magnesium sulfate, and then evaporated to leave a solid product. This solid product was dissolved in methylene chloride and absorbed on a column of silica gel of 4.8 x 70 cm. The column was eluted with 100 ml. fractions of methylene chloride. Fractions 11 to 22 were combined and evaporated to give an oil which solidified. This solid product was crystallized from acetone-Skellysolve B hexanes to give 4.2 g. (86%) of 2,3-bis(p-methoxyphenyl)-5-phenylpyrrole of M.P. 133–135° C. in the form of ivory colored needles.

Ultraviolet: $\lambda_{max}$. 237 (18,350); 257 (17,250); 295 (21,800); 319.5 (27,650).

Analysis.—Calcd. for $C_{24}H_{21}NO_2$ (percent): C, 81.10; H, 5.96; N, 3.94. Found (percent): C, 81.19; H, 6.05; N, 4.00.

(c) 2 - phenyl - 3 - [(dimethylamino)methyl]-4,5-bis(p-methoxyphenyl)pyrrole (X):

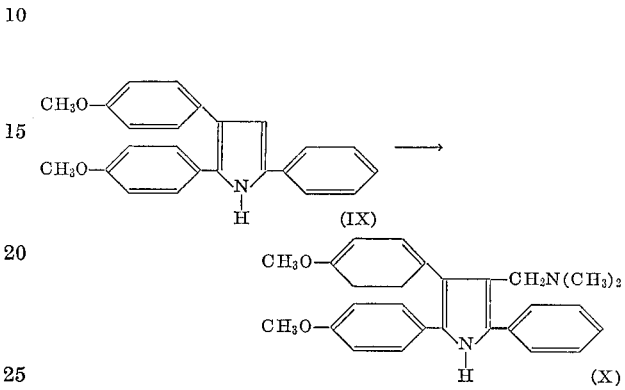

A mixture of 6.6 g. (0.0186 mole) of 2,3-bis(p-methoxyphenyl)-5-phenylpyrrole (IX) 12 ml. of aqueous 25% dimethylamine, 4 ml. of aqueous 37% formaldehyde, and 50 ml. of acetic acid was heated on a steam bath until the solid dissolved. This took place in about 15 minutes. The solution was allowed to stand overnight, then was diluted with water and extracted with ether. The ether extracts were washed with water, the combined aqueous layer and water washings were cooled in an ice bath, basified with 50% aqueous sodium hydroxide and extracted with methylene chloride. The methylene chloride extract was washed with water and dried over anhydrous magnesium sulfate. It was then evaporated to give a solid which was recrystallized from acetone-Skellysolve B hexanes to give 5.8 g. (76%) of pink crystals of M.P. 152–154.5° C. which upon recrystallization gave 2 - phenyl - 3[(dimethylamino)methyl] - 4,5 - bis-(p-methoxyphenyl)pyrrole (X) of M.P. 153–154° C.

Ultraviolet: $\lambda_{max}$. 231 (17,800); Sl, sh. 255 (12,550); 308 (22,800).

Analysis.—Calcd. for $C_{27}H_{28}N_2O_2$ (percent): C, 78.61; H, 6.84; N, 6.79. Found (percent): C, 78.33; H, 7.50; N, 6.86.

(d) Methodide of 2 - phenyl - 3 - [(dimethylamino)methyl] - 4,5 - bis(p - methoxyphenyl)pyrrole: To a solution of 3 g. of 2 - phenyl - 3 - [(dimethylamino)methyl] - 4,5 - bis - (p - methoxyphenyl)pyrrole in 50 ml. of tetrahydrofuran was added 2 ml. of methyl iodide. The mixture was allowed to stand for 1 hour, and the solid which had formed during this period was collected by filtration and washed with ether to give 3.8 g. of an ivory colored solid, M.P. 179.5–182° C. This material was crystallized from dimethylformamide-ether to give as a colorless solid the methiodide of 2 - phenyl - 3 - [(dimethylamino)methyl] - 4,5 - bis - (p - methoxyphenyl) pyrrole of M.P. 182–184° C.

Ultraviolet: $\lambda_{max}$. Sl. sh. 223 (31,500); 301 (24,650).

Analysis.—Calcd. for $C_{28}H_{31}IN_2O_2$ (percent): C, 60.65; H, 5.64; I, 22.89. Found (percent): C, 59.86; H, 6.38; I, 23.01.

(e) 4,5 - bis(p - methoxyphenyl) - 2 - phenylpyrrole-3-acetonitrile: To a solution of 11.9 g. of 2-phenyl-3-[(dimethylamino)methyl] - 4,5 - bis(p - methoxyphenyl) pyrrole in 100 ml. of tetrahydrofuran was added 10 ml. of methyl iodide. A solid separated immediately. The mixture was allowed to stand overnight. The solvent and excess methyl iodide were evaporated to give a solid product which was mixed with 5 g. of sodium cyanide and 100 ml. of dimethylformamide. This reaction mixture was refluxed for 2.5 hours. After this period the solution was cooled, 400 ml. of water was added and it was thereupon extracted with 2 portions, each 250 ml., of ether. The ether extracts were combined, washed with water and then with saturated aqueous sodium chloride solution, and thereupon dried over anhydrous magnesium sulfate. The dry solution was then concentrated and Skellysolve B hexanes was added until crystals separated. The mixture was then cooled and filtered, giving 9.2 g. (81%) of ivory colored crystals of 4,5-bis(p-methoxyphenyl) - 2 - phenylpyrrole - 3 - acetonitrile of M.P. 154–156° C.

Ultraviolet: $\lambda_{max}$. 232 (19,850); 308 (26,950).

*Analysis.*—Calcd. for $C_{26}H_{22}N_2O_2$ (percent): C, 79.16; H, 5.62; N, 7.10. Found (percent): C, 78.76; H, 5.77; N, 7.11.

EXAMPLE 2

2,4,5-triphenylpyrrole-3-acetonitrile (a) 1,2,4 - triphenyl - 1,4 - butanedione: A mixture of 50 g. (0.235 mole) of benzoin, 24 g. (0.2 mole) of acetophenone and 4 g. of powdered potassium hydroxide was heated at 155–175° C. on an oil bath for a period of 1 hour. The reaction mixture was cooled and water and methylene chloride were added. The organic layer was separated, washed with saturated sodium chloride solution and dried with anhydrous magnesium sulfate. The dried solution was concentrated in vacuo to give an oily material which was flushed with acetone, leaving a solid residue. This residue was suspended in 250 ml. of hot ethanol; the mixture was then cooled and filtered to give 53.6 g. (72%) of product melting at 120–127° C. This product was twice recrystallized from acetone to give 1,2,4 - triphenyl - 1,4 - butanedione of M.P. 127–129° C.

*Analysis.*—Calcd. for $C_{22}H_{18}O_2$ (percent): C, 84.05; H, 5.77. Found (percent): C, 83.91; H, 5.89.

(b) 2,3,5-triphenylpyrrole: A solution of 5 g. of 1,2,4-triphenyl-1,4-butanedione and 30 ml. of formamide was heated at reflux for 2.5 hours. The reaction mixture was then cooled and water added. A precipitate was formed which was collected and recrystallized from a mixture of cyclohexane and ethanol to give 2.1 g. (45%) of 2,3,5-triphenylpyrrole of M.P. 143.5–144.5° C.

*Analysis.*—Calcd. for $C_{22}H_{17}N$ (percent): C, 89.46; H, 5.80; N, 4.74. Found (percent): C, 89.26; H, 6.22; N, 4.88.

(c) 2,3,5 - triphenyl - 4 - (dimethylaminomethyl) pyrrole: To a cold solution of 11 ml. of aqueous 37% formaldehyde and 63 ml. of glacial acetic acid was slowly added 33 ml. of aqueous 25% dimethylamine. This total solution was thereupon added to a solution of 15 g. (0.05 mole) of 2,3,5-triphenyl-pyrrole in 125 ml. of dioxane. The reaction mixture was stirred for 28 hours at room temperature (24–26° C.); thereafter, the mixture was diluted with 250 ml. of water and extracted with ether. The ether layer was separated, washed with water and the washings and water layers were combined and made basic with 1 N sodium hydroxide. The mixture was extracted with methylene chloride, the methylene chloride extract was washed with a saturated solution of sodium chloride, dried and concentrated in vacuo to give a residue. This residue was twice recrystallized from acetonitrile to give 11.5 g. of 2,3,5-triphenyl-4-(dimethylaminomethyl)pyrrole of M.P. 159–160° C.

(d) 2,3,5 - triphenyl - 4 - (dimethylaminomethyl)- pyrrole methiodide: To a solution of 10 g. (0.0285 mole) of 2,3,5-triphenyl-4-(dimethylaminomethyl)pyrrole in 100 ml. of tetrahydrofuran was added 15 ml. of methyl iodide. The mixture was stirred at room temperature for 3 hours and filtered. There was obtained 12.7 g. (91%) of product which melted at 189.5–190.5° C. and which was 2,3,5-triphenyl-4-(dimethylaminomethyl)pyrrole methiodide.

(e) 2,4,5-triphenylpyrrole-3-acetonitrile: A mixture of 10 g. (0.02 mole) of 2,3,5-triphenyl-4-(dimethylaminomethyl)pyrrole methiodide and 4 g. of sodium cyanide in 80 ml. of dimethylformamide was heated at reflux for 1¾ hours. The reaction mixture was then cooled and 400 ml. of water was added. The mixture was then extracted with ether, the ether layer was washed with water and then with saturated sodium chloride solution. The ether layer was then dried, concentrated in vacuo to give a residue which was crystallized from isopropanol to give 5.7 g. (85%) of product melting at 143–145.5° C. Recrystallization from ethanol gave pure 2,4,5-triphenylpyrrole-3-acetonitrile of M.P. 145° C.

*Analysis.*—Calcd. for $C_{24}H_{18}N_2$ (percent): C, 86.20; H, 5.43; N, 8.38. Found (percent): C, 85.42; H, 5.52; N, 8.29.

EXAMPLE 3

1-methyl-4,5-bis(p-methoxyphenyl)-2-phenylpyrrole-3-acetonitrile (a) 2,3 - bis(p - methoxyphenyl) - 1 - methyl - 5 - phenylpyrrole: A mixture of 50 g. (0.183 mole) of anisoin, 24 g. (0.2 mole) of acetophenone and 4 g. of powdered potassium hydroxide was heated slowly to 145° C. while allowing the water vapor to escape. The mixture was then heated at 160–170° C. for 2 hours, cooled, and 300 ml. of methylformamide added. The mixture was refluxed for 2 hours, cooled and diluted with 500 ml. of water. The mixture was then extracted with methylene chloride, the extracts combined, washed with water, dried over anhydrous sodium sulfate, and concentrated to give a residue. This residue was crystallized from 95% ethanol and thereupon twice recrystallized from 95% ethanol to give 34.1 g. (50.5%) of 2,3-bis(p-methoxyphenyl)-1-methyl-5-phenylpyrrole of M.P. 128–129° C.

*Analysis.*—Calcd. for $C_{25}H_{23}NO_2$ (percent): C, 81.26; H, 6.28; N, 3.79. Found (percent): C, 81.38; H, 6.39; N, 3.85.

(b) 1 - methyl - 2,3 - bis(p - methoxyphenyl) - 4 - dimethylaminomethyl-5-phenylpyrrole: To a solution of 30.6 g. (0.083 mole) of 2,3-bis(p-methoxyphenyl)-1-methyl-5-phenylpyrrole in 230 ml. of dioxane was added an ice-cold solution of 59.5 ml. of aqueous 25% dimethylamine, 20.2 ml. of aqueous 37% formaldehyde and 111 ml. of acetic acid. A solid precipitated and redissolved on standing overnight. The solution was heated on the steam bath 2 hours, cooled, diluted with water and extracted with ether. The ether layer was washed with water. The combined aqueous layers were cooled and basified with 50% aqueous sodium hydroxide and then extracted with methylene chloride. The extract was dried over anhydrous magnesium sulfate and concentrated. The resulting oily residue was dissolved in ⅓ N hydrochloric acid, extracted with ether and the aqueous layer basified with a saturated aqueous sodium carbonate solution. The mixture was thereupon extracted with methylene chloride, the methylene chloride extracts were then combined, dried over anhydrous magnesium sulfate and concentrated to give a residue. This residue was crystallized from isopropanol to give 23.5 g. (66.5%) of colorless prisms melting at 111–113.5° C. This material was recrystallized from isopropanol (twice) to give 1-methyl-2,3-bis(p-methoxyphenyl) - 4 - (dimethylaminomethyl) - 5 - phenylpyrrole of M.P. 113–114° C.

*Analysis.*—Calcd. for $C_{28}H_{30}N_2O_2$ (percent): C, 78.84; H, 7.09; N, 6.57. Found (percent): C, 78.94; H, 7.12; N, 6.69.

(c) 1 - methyl - 4,5 - bis(p-methoxyphenyl) - 2 - phenylpyrrole-3-acetonitrile: To a solution of 20.92 g. (0.049 mole) of 1-methyl-2,3-bis(p-methoxyphenyl)-4-(dimethylaminomethyl)-5-phenylpyrrole in 150 ml. of tetrahydrofuran, cooled in an ice bath, was added 30 ml. of methyl iodide. The mixture was heated under reflux for 7 hours and then allowed to stand for 72 hours. The reaction mixture was thereupon concentrated in vacuo.

The residue was triturated with ether and the insoluble material removed by filtration.

A mixture of 28.9 g. (0.059 mole) of the methiodide thus obtained, 5.9 g. (0.118 mole) of sodium cyanide and 150 ml. of dimethylformamide was heated under reflux for 2½ hours. The solution was diluted with 700 ml. of water and the mixture extracted with ether. The combined ether extracts were washed with water and then with a saturated solution of sodium chloride. The mixture was then filtered to remove insoluble material. This material, 3 g. and of M.P. 247–251° C. was recrystallized from dioxane-ethanol to give colorless prisms of 1-methyl-4,5-bis(p - methoxyphenyl) - 2 - phenylpyrrole - 3 - acetonitrile of M.P. 250–252° C.

*Analysis.*—Calcd. for $C_{27}H_{24}N_2O_2$ (percent): C, 79.38; H, 5.92. Found (percent): C, 79.41; H, 6.31.

EXAMPLE 4

4,5-diphenyl-2-(p-tolyl)pyrrole-3-acetonitrile (a) 2 - (p - tolyl) - 3 - [(dimethylamino)methyl]-4,5-diphenylpyrrole: In the manner given in Example 1(c), 2,3-diphenyl-5-(p-tolyl)pyrrole (German Pat. 1,105,714) was reacted with dimethylamine and aqueous formaldehyde in acetic acid at about 95–100° C. to give 2-(p-tolyl)-3-[(dimethylamino)methyl]-4,5-diphenylpyrrole.

(b) Methiodide of 2-(p-tolyl)-3-[(dimethylamino)-methyl]4,5-diphenylpyrrole: In the manner given in Example 1(d), 2-(p-tolyl)-3-[(dimethylamino)methyl]-4,5-diphenylpyrrole was reacted with methyl iodide in tetrahydrofuran to give the methoiodide of 2-(p-toly)-3-[(dimethylamino)methyl]-4,5-diphenylpyrrole.

(c) 4,5-diphenyl-2-(p-tolyl)-pyrrole-3-acetonitrile: In the manner given in Example 1(e), the methiodide of 2 - (p - tolyl) - [(dimethylamino)methyl] - 4,5 - diphenylpyrrole was reacted with sodium cyanide in dimethylformamide to give 4,5-diphenyl-2-(p-tolyl)pyrrole-3-acetonitrile.

EXAMPLE 5

4,5-diphenyl-3-(p-anisyl)pyrrole-3-acetonitrile (a) 2 - (p - anisyl) - 3 -[(dimethylamino)methyl] - 4,5-diphenylpyrrole: In the manner given in Example 1(c), 2,3-diphenyl-5-(p-anisyl)pyrrole (German Pat. 1,105,714) was reacted with dimethylamine and aqueous formaldehyde in acetic acid at about 95–100° C. to give 2 - (p - anisyl) - 3 - [(dimethylamino)methyl] - 4,5 - diphenylpyrrole.

(b) Methiodide of 2-(p-anisyl)-3-[(dimethylamino)methyl]-4,5-diphenylpyrrole: In the manner given in Example 1(d), 2-(p-anisyl)-3-[(dimethylamino)methyl]-4,5-diphenylpyrrole was reacted with methyl iodide in tetrahydrofuran to give the methiodide of 2-(p-anisyl)-3-[(dimethylamino)methyl]-4,5-diphenylpyrrole.

(c) 4,5-diphenyl-2-(p-anisyl)-pyrrole-3-acetonitrile: In the manner given in Example 1(e), the methiodide of 2-(p-anisyl)-3-[(dimethylamino)methyl] - 4,5 - diphenylpyrrole was reacted with sodium cyanide in dimethylformamide to give 4,5 - diphenyl-2-(p-anisyl)pyrrole-3-acetonitrile.

EXAMPLE 6

4,5-bis(p-chlorophenyl)-2-phenylpyrrole-3-acetonitrile (a) 2-phenyl - 3 - [(dimethylamino)methyl]-4,5-bis(p-chlorophenyl)pyrrole: In the manner given in Example 1(c), 2,3-bis(p-chlorophenyl)-5-phenylpyrrole (German Pat. 1,105,714) was reacted with dimethylamine and aqueous formaldehyde in acetic acid at about 95–100° C. to give 2-phenyl-3-[(dimethylamino)methyl]-4,5-bis-(p-chlorophenyl)pyrrole.

(b) Methiodide of 2 - phenyl - 3 - [(dimethylamino) methyl]-4,5-bis(p-chlorophenyl)pyrrole: In the manner given in Example 1(d), 2-phenyl-3-[(dimethylamino) methyl]4,5-bis(p-chlorophenyl)pyrrole was reacted with methyl iodide in tetrahydrofuran to give the methiodide of 2-phenyl-3-[(dimethylamino)methyl]-4,5-bis(p-chlorophenyl)pyrrole.

(c) 4,5 - bis(p-chlorophenyl)-2-phenylpyrrole-3-acetonitrile: In the manner given in Example 1(e), the methiodide of 2-phenyl-3-[(dimethylamino)methyl]-4,5-bis(p-chlorophenyl)pyrrole was reacted with sodium cyanide in dimethylformamide to give 4,5-bis(p-chlorophenyl)-2-phenylpyrrole-3-acetonitrile.

EXAMPLE 7

4,5-bis(p-chlorophenyl)-2-(p-anisyl)pyrrole-3-acetonitrile (a) 2-(p-anisyl)-3-[(dimethylamino)methyl]-4,5-bis(p-chlorophenyl)pyrrole: In the manner given in Example 1(c), 2,3-bis(p-chlorophenyl)-5-(p-anisyl)pyrrole (German Pat. 1,105,714) was reacted with dimethylamine and aqueous formaldehyde in acetic acid at about 95–100° C. to give 2-(p-anisyl)-3-[(dimethylamino)methyl]-4,5-bis (p-chlorophenyl)pyrrole.

(b) Methiodide of 2-(p-anisyl)-3-[(dimethylamino) methyl]-4,5-bis(p-chlorophenyl)pyrrole: In the manner given in Example 1(d), 2-(p-anisyl)-3-[(dimethylamino) methyl]-4,5-bis(p-chlorophenyl)pyrrole was reacted with methyl iodide in tetrahydrofuran to give the methiodide of 2 - (p-anisyl) - 3 - [(dimethylamino)methyl]-4,5-bis(p-chlorophenyl) pyrrole.

(c) 4,5-bis(p-chlorophenyl) - 2 - (p - anisyl)pyrrole-3-acetonitrile: In the manner given in Example 1(e), the methiodide of 2-(p-anisyl)-3-[(dimethylamino)methyl]-4,5-bis(p-chlorophenyl)pyrrole was reacted with sodium cyanide in dimethylformamide to give 4,5-bis(p-chlorophenyl)-2-(p-anisyl)pyrrole-3-acetonitrile.

EXAMPLE 8

4,5-diphenyl-2-(o-bromophenyl)pyrrole-3-acetonitrile (a) 2,3-diphenyl-5-(o-bromophenyl)pyrrole: In the manner given in Example 2(a), benzoin, 2'-bromoacetophenone and powdered potassium hydroxide were heated together and the resulting product was heated with formamide (Example 2(b)) to give 2,3-diphenyl-5-(o-bromophenyl)pyrrole.

(b) 2 - (o-bromophenyl)-3-[(dimethylamino)methyl]-4,5-diphenylpyrrole: In the manner given in Example 1(c), 2,3-diphenyl-5-(o-bromophenyl)pyrrole was reacted with dimethylamine and aqueous formaldehyde in acetic acid at about 95–100° C. to give 2-(o-bromophenyl)-3-[(dimethylamino)methyl]-4,5-diphenylpyrrole.

(c) Methiodide of 2-(o-bromophenyl)-3-[(dimethylamino) methyl]-4,5-diphenylpyrrole: In the manner given in Example 1(d), 2 - (o-bromophenyl) - 3 - [(dimethylamino)methyl] - 4,5 - diphenylpyrrole was reacted with methyl iodide in tetrahydrofuran to give the methiodide of 2 - (o-bromophenyl)-3-[(dimethylamino)methyl]-4,5-diphenylpyrrole.

(d) 4,5-diphenyl-2-(o-bromophenyl)pyrrole-3-acetonitrile: In the manner given in Example 1(e), the methiodide of 2 - (o - bromophenyl) - 3 - [(dimethylamino) methyl]-4,5-diphenylpyrrole was reacted with sodium cyanide in dimethylformamide to give 4,5-diphenyl-2-(o-bromophenyl)pyrrole-3-acetonitrile.

EXAMPLE 9

4,5-diphenyl-2-(m-iodophenyl)pyrrole-3-acetonitrile (a) 2,3-diphenyl-5-(m-iodophenyl)pyrrole: In the manner given in Example 2(a), benzoin, m-iodoacetophenone and potassium hydroxide were heated together and the resulting product was heated with formamide (Example 2(b)) to give 2,3-diphenyl-5-(m-iodophenyl)pyrrole.

(b) 2-(m-iodophenyl) - 3 - [(dimethylamino)methyl]-4,5-diphenylpyrrole: In the manner given in Example 1(c), 2,3-diphenyl-5-(m-iodophenyl)pyrrole was reacted with dimethylamine and aqueous formaldehyde in acetic acid at about 95–100° C. to give 2-(m-iodophenyl-3-[(dimethylamino)methyl]-4,5-diphenylpyrrole.

(c) Methiodide of 2 - (m-iodophenyl)-3-[(dimethylamino)methyl]-4,5-diphenylpyrrole: In the manner given in Example 1(d), 2-(m-iodophenyl)-3-[(dimethylamino)methyl]-4,5-diphenylpyrrole was reacted with methyl iodide in tetrahydrofuran to give the methiodide of 2-(m-iodophenyl)-3-[(dimethylamino)methyl] - 4,5 - diphenylpyrrole.

(d) 4,5-diphenyl - 2 - (m-iodophenyl)pyrrole-3-acetonitrile: In the manner given in Example 1(e), the methiodide of 2-(m-iodophenyl)-3-[(dimethylamino)methyl]-4,5-diphenylpyrrole was reacted with sodium cyanide in dimethylformamide to give 4,5 - diphenyl - 2 - (m - iodophenyl)pyrrole-3-acetonitrile.

EXAMPLE 10

4,5-diphenyl-2-(p-butylphenyl)pyrrole-3-acetonitrile (a) 2,3-diphenyl-5-(p-butylphenyl)pyrrole: In the manner given in Example 2(a), benzoin, p-butylacetophenone and potassium hydroxide were heated together and the resulting product was heated with formamide (Example 2(b)) to give 2,3-diphenyl-5-(p-butylphenyl)pyrrole.

(b) 2-(p-butylphenyl) - 3 - [(dimethylamino)methyl]-4,5-diphenylpyrrole: In the manner given in Example 1(c), 2,3-diphenyl-5-(p-butylphenyl)pyrrole was reacted with dimethylamine and aqueous formaldehyde in acetic acid at about 95–100° C. to give 2-(p-butylphenyl)-3-[(dimethylamino)methyl]-4,5-diphenylpyrrole.

(c) Methiodide of 2 - (p-butylphenyl)-3-[(dimethylamino)methyl]-4,5-diphenylpyrrole: In the manner given in Example 1(d), 2-(p-butylphenyl)-3-[(dimethylamino)methyl]-4,5-diphenylpyrrole was reacted with methyl iodide in tetrahydrofuran to give the methiodide of 2-(p-butylphenyl) - 3 - [(dimethylamino)methyl] - 4,5 - diphenylpyrrole.

(d) 4,5-diphenyl - 2 - (p-butylphenyl)pyrrole-3-acetonitrile: In the manner given in Example 1(e), the methiodide of 2-(p-butylphenyl)-3-[(dimethylamino)methyl]-4,5-diphenylpyrrole was reacted with sodium cyanide in dimethylformamide to give 4,5 - diphenyl - 2-(p-butylphenyl)pyrrole-3-acetonitrile.

EXAMPLE 11

4,5-diphenyl-2-(m-trifluoromethylphenyl)pyrrole-3-acetonitrile (a) 2,3-diphenyl-5-(m-trifluoromethylphenyl)pyrrole: In the manner given in Example 2(a), benzoin, m-trifluoromethyl-acetophenone and potassium hydroxide were heated together and the resulting product was heated with formamide (Example 2(b)) to give 2,3-diphenyl-5-(m-trifluoromethylphenyl)pyrrole.

(b) 2-(m-trifluoromethylphenyl)-3-[(dimethylamino)methyl]-4,5-diphenylpyrrole: In the manner given in Example 1(c), 2,3 - diphenyl-5-(m-trifluoromethylphenyl)pyrrole was reacted with dimethylamine and aqueous formaldehyde in acetic acid at about 95–100° C. to give 2-(m-trifluoromethylphenyl) - 3 - [dimethylamino)methyl]-4,5-diphenylpyrrole.
3-[(dimethylamino)methyl]-4,5-diphenylpyrrole.

(c) Methiodide of 2-(m-trifluoromethylphenyl)-3-[(dimethylamino)methyl]-4,5-diphenylpyrrole: In the manner given in Example 1(d), 2 - (m-trifluoromethylphenyl)-3-[(dimethylamino)methyl]-4,5 - diphenylpyrrole was reacted with methyl iodide in tetrahydrofuran to give the methiodide of 2-(m-trifluoromethylphenyl)-3-[(dimethylamino)methyl]-4,5-diphenylpyrrole (d) 4,5-diphenyl-2-(m-trifluoromethylphenyl)pyrrole-3-acetonitrile: In the manner given in Example 1(e), the methiodide of 2-(m-trifluoromethylphenyl)-3-[(dimethylamino)methyl]-4,5 - diphenylpyrrole was reacted with sodium cyanide in dimethylformamide to give 4,5-diphenyl - 2 - (m-trifluoromethylphenyl)pyrrole-3-acetonitrile.

EXAMPLE 12

2-(p-fluorophenyl)-4-(m-ethoxyphenyl)-5-(p-methoxyphenyl)pyrrole-3-acetonitrile (a) 3-ethoxy-4'-methoxybenzoin (XI):

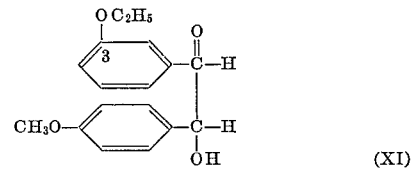

3-ethoxy-4' - methoxybenzoin was prepared in known manner, i.e., by an exchange reaction between anisoin and m-ethoxybenzaldehyde.

(b) 1-(p-methoxyphenyl) - 2-(m-ethoxyphenyl)-4-(p-fluorophenyl)-1,4-butanedione:

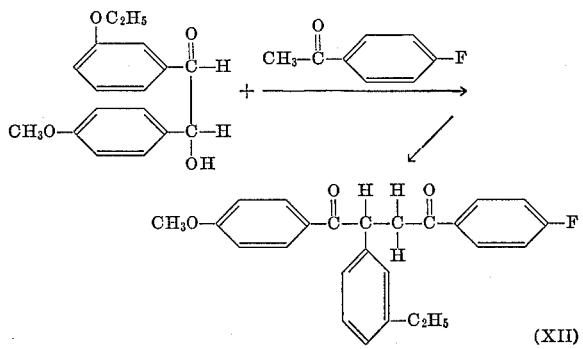

In the manner given in Example 2(a), 3-ethoxy-4'-methoxybenzoin (XI) and p-fluoroacetophenone were condensed in the presence of powdered potassium hydroxide to give 1 - (p-methoxyphenyl) - 2-(m-ethoxyphenyl)-4-(p-fluorophenyl)-1,4-butanedione (XII).

(c) 2 - (p-methoxyphenyl)-3-(m-ethoxyphenyl)-5-(p-fluorophenyl)pyrrole: In the manner given in Example 2(b), 1-(p-methoxyphenyl)-2 - (m-ethoxyphenyl)-4-(p-fluorophenyl)-1,4 - butanedione (XII) was heated with formamide to give 2-(p-methoxyphenyl) - 3-(m-ethoxyphenyl)-5-(p-fluorophenyl)pyrrole.

(d) 2 - (p-fluorophenyl)-3-[(dimethylamino)methyl]-4-(m-ethoxyphenyl)-5-(p-methoxyphenyl)pyrrole: In the manner given in Example 1(c), 2-(p-methoxyphenyl)-3-(m-ethoxyphenyl)-5-(p-fluorophenyl)pyrrole was reacted with dimethylamine and aqueous formaldehyde in acetic acid at about 95 to 100° C. to give 2-(p-fluorophenyl)-3-[(dimethylamino)methyl] - 4 - (m-ethoxyphenyl)-5-(p-methoxyphenyl)pyrrole.

(e) Methiodide of 2-(p-fluorophenyl)-3 - [(dimethylamino) methyl] - 4 - (m-ethoxyphenyl-5-(p-methoxyphenyl)pyrrole: In the manner given in Example 1(d), 2-(p-fluorophenyl)-3-[(dimethylamino)methyl] - 4 - (m-ethoxyphenyl)-5-(p-methoxyphenyl) pyrrole was treated with methyl iodide in tetrahydrofuran to give the methiodide of 2 - (p-fluorophenyl) - 3 - [(dimethylamino)methyl]-4-(m-ethoxyphenyl)-5 - (p-methoxyphenyl)pyrrole.

(f) 2-(p-fluorophenyl) - 4 - (m-ethoxyphenyl)-5-(p-methoxyphenyl)pyrrole - 3-acetonitrile: In the manner given in Example 1(e), the methiodide of 2-(p-fluorophenyl) - 3 - [(dimethylamino)methyl] - 4-(m-ethoxyphenyl)-5 - (p-methoxyphenyl)pyrrole was reacted with sodium cyanide in dimethylformamide to give 2-(p-fluorophenyl)-4-(m-methoxyphenyl) - 5 - (p-methoxyphenyl)-pyrrole-3-acetonitrile.

EXAMPLE 13

2-(p-trifluoromethylphenyl)-4-(m-butylphenyl)-5-(p-fluorophenyl)-α-methylpyrrole-3-acetonitrile (a) 3-butyl-4'-fluorobenzoin: 3-butyl-4'-fluorobenzoin was prepared in known manner, i.e., by an exchange reaction between p-fluorobenzoin and m-butylbenzaldehyde.

(b) 1-(p-fluorophenyl)-2 - (m-butylphenyl)-4-(m-trifluoromethylphenyl)-1,4 - butanedione: In the manner given in Example 2(a), 3-butyl-4'-fluorobenzoin and m-trifluoromethylacetophenone were condensed in the presence of powdered potassium hydroxide to give 1-(p-fluorophenyl) - 2 - (m-butylphenyl) - 4-(m-trifluoromethylphenyl)-1,4-butanedione.

(c) 2-(p-fluorophenyl) - 3 - (m-butylphenyl)-5-(p-trifluorophenyl)pyrrole: In the manner given in 2(b), 1-(p-fluorophenyl)-2-(m-butylphenyl)-4 - (p-trifluoromethylphenyl)-1,4-butanedione was heated with formamide to give 2-(p-fluorophenyl)-3-(m-butylphenyl)-5-(p-trifluoromethylphenyl)pyrrole.

(d) 2-(p-trifluoromethylphenyl)-3-[(1-dimethylamino)ethyl]-4-(m-butylphenyl)-5-(p-fluorophenyl)pyrrole: In the manner given in Example 1(c), 2-(p-fluorophenyl)-3-(m-butylphenyl) - 5 - (p-trifluoromethylphenyl)pyrrole was reacted with dimethylamine and aqueous acetaldehyde in acetic acid at about 95 to 100° C. to give 2-(p-trifluoromethylphenyl)-3-[1 - (dimethylamino)ethyl]-4-(m-butylphenyl)-5-(p-fluorophenyl)pyrrole.

(e) Methiodide of 2-(p-trifluoromethylphenyl)-3-[1-(dimethylamino)ethyl]-4-(m-butylphenyl) - 5 - (p-fluorophenyl)-pyrrole: In the manner given in Example 1(d), 2-(p-trifluoromethylphenyl) - 3 - [1 - (dimethylamino)-ethyl]-4-(m - butylphenyl)-5-(p-fluorophenyl)pyrrole was treated with methyl iodide in tetrahydrofuran to give the methiodide of 2-(p-trifluoromethylphenyl) - 3 - [1-(dimethylamino)ethyl]-4-(m-butylphenyl) - 5 - (p-fluorophenyl)pyrrole.

(f) 2 - (p-trifluoromethylphenyl)-4-(m-butylphenyl-5-(p-fluorophenyl)-α-methylpyrrole-3-acetonitrile: In the manner given in Example 1(e), the methiodide of 2-(p-trifluoromethylphenyl) - 3 - [1-(dimethylamino)ethyl]-4-(m-butylphenyl)-5-(p-fluorophenyl)pyrrole was reacted with sodium cyanide in dimethylformamide to give 2-(p-trifluoromethylphenyl)-4-(m-butylphenyl) - 5 - (p-fluorophenyl)-α-methylpyrrole-3-acetonitrile.

EXAMPLE 14

4,5-Bis(p-propoxyphenyl)-2-(o-ethylphenyl)pyrrole-3-acetonitrile (a) 1,2 - bis(p-propoxyphenyl)-4-(o-ethylphenyl)-1,4-butanedione: In the manner given in Example 2(a), 4,4'-bis(p-propoxy)benzoin and o-ethylacetophenone were condensed in the presence of powdered potassium hydroxide to give 1,2-bis(p-propoxyphenyl)-4-(o-ethylphenyl)-1,4-butanedione.

(b) 2,3-bis - (p-propoxyphenyl)-5-(o-ethylphenyl)pyrrole: In the manner given in Example 2(b), 1,2-bis-(p-propoxyphenyl)-4-(o-ethylphenyl)-1,4 - butanedione was heated with formamide to give 2,3-bis(p-propoxyphenyl)-5-(o-ethylphenyl)pyrrole.

(c) 2-(o-ethylphenyl) - 4,5 - bis(p-propoxyphenyl)-3-(chloromethyl)pyrrole: 2,3 - bis(p-propoxyphenyl)-5-(o-ethylphenyl)pyrrole was dissolved in chloroform and to this solution was added paraformaldehyde and zinc chloride. The mixture was then cooled to about 7° C. and dry hydrogen chloride gas was passed through the mixture for a period of 20 minutes. Thereafter the mixture was stirred overnight (about 16 hours) at room temperature (about 22–24° C.). Water was added and the mixture was extracted with ether. The ether extracts were combined, dried over anhydrous magnesium sulfate and evaporated to give 2-(o-ethylphenyl)-4,5-bis(p-propoxyphenyl)-3-(chloromethyl)pyrrole.

(d) 4,5 - bis(p-propoxyphenyl)-2-(o-ethylphenyl)pyrrole-3-acetonitrile: To a solution of 2-(o-ethylphenyl)-4,5-bis(p-propoxyphenyl) - 3 - (chloromethyl)pyrrole in methanol was added potassium cyanide in aqueous methanol. The mixture was heated for 6 hours, cooled to room temperature and allowed to stand overnight. Water was added and the precipitate which formed was collected on a filter, washed and twice recrystallized from acetonitrile to give 4,5-bis(p-propoxyphenyl)-2-(o-ethylphenyl)-pyrrole-3-acetonitrile.

EXAMPLE 15

4,5-bis(p-methoxyphenyl)-2-phenylfuran-3-acetonitrile (a) Method (1).—2,3-bis(p-methoxyphenyl)-5-phenylfuran: A mixture of 25.6 g. (0.1 mole) of desoxyanisoin, 8.55 g. (0.12) mole) of pyrrolidine, a few crystals of p-toluenesulfonic acid, and 300 ml. of benzene was refluxed for 17.5 hrs. using a water separator (0.5 ml. of aqueous layer was collected). An additional 23 g. of pyrrolidine was added and refluxing was continued for 24 hrs. (a total of 1.9 ml. of aqueous layer was collected). The benzene and excess pyrrolidine were evaporated. The residue which was obtained was dissolved in 200 ml. of toluene, heated to reflux and stirred. To this mixture was added a solution of 19.9 g. (0.1 mole) of phenacyl bromide in 100 ml. of dry toluene during a period of ½ hr. The mixture was refluxed an additional 2 hrs., cooled slightly and 100 ml. of water was added cautiously. The mixture was thereupon refluxed for another 2 hrs. under continuous stirring. The toluene layer was washed with water, twice with dilute hydrochloric acid, and water, and then dried over anhydrous magnesium sulfate. The dried solution was evaporated to give 29.6 g. of a brown oil which partially solidified. The semi-solid was subjected to column chromatography (silica gel) employing methylene chloride and then 3% acetone-97% methylene chloride as eluants. The solid eluted by methylene chloride was crystallized from acetone-Skellysolve B hexanes, giving 4.6 g. of 2,3-bis(p-methoxyphenyl)-5-phenylfuran in the form of ivory needles of M.P. 113–114.5° C.

Ultraviolet: $\lambda_{max.}$ 233 (19,050); 264 (20,900); 288 (4,900); 330 (25,750).

Analysis.—Calcd. for $C_{24}H_{20}O_3$ (percent): C, 80.88; H, 5.66. Found (percent): C, 81.11; H, 5.96.

The second solid eluted by methylene chloride was crystallized from acetone-Skellysolve B hexanes, giving 5 g. of crystalline material in the form of needles which was once more recrystallized from acetone-Skellysolve B hexanes to give 3.8 g. of 1,2-bis(p-methoxyphenyl)-4-phenyl-1,4-butanedione of M.P. 129–131° C.

Method (2).—2,3-bis(p-methoxyphenyl) - 5 - phenylfuran: A mixture of 18.8 g. (0.069 mole) of anisoin, 9.6 g. (0.08 mole) of acetophenone, and 4 g. of potassium hydroxide in a large flask fitted with an air condenser was heated in an oil bath at 160° C. for 40 min. As the mixture became hot, a vigorous reaction ensued and the mixture foamed vigorously. The cooled residue was treated with methylene chloride and water. The methylene chloride layer was dried over anhydrous magnesium sulfate and evaporated to give 21.4 g. of a dark yellow oil. This oil was chromatographed over a silica gel column, employing 3% acetone-97% methylene chloride as the eluant. The first solid obtained from the elution was recrystallized from acetone-Skellysolve B hexanes to give 8.95 g. of 1,2-bis(p-methoxyphenyl)-4-phenyl-1,4-butanedione as yellow needles of M.P. 129–130.5° C., which upon recrystallization from the same solvent mixture melted at 131–132° C.

Analysis.—Calcd. for $C_{24}H_{22}O_4$ (percent): C, 76.98; H, 5.92. Found (percent): C, 76.82; H, 6.29.

To 10 g. of 1,2-bis(p-methoxyphenyl)-4-phenyl-1,4-butanedione was added 25 ml. of concentrated sulfuric acid. The reaction mixture was stirred for 10 min. and then poured into 600 ml. of ice-water. Ether was added and the mixture was filtered. The ether layer of the filtrate was separated, dried and concentrated in vacuo to give 2,3-bis(p-methoxyphenyl)-5-phenylfuran.

(b) 4,5 - bis(p-methoxyphenyl-2-phenylfuran-3-acetonitrile: A mixture was prepared containing 7.2 g. of 2,3-bis(p-methoxyphenyl)-5-phenylfuran, 0.7 g. of anhydrous zinc chloride, 20 ml. of chloroform and 1.0 g. of paraformaldehyde. This mixture was cooled to 4° C. and thereupon hydrogen chloride gas was passed into it for a period of 30 minutes. During this period the temperature rose to 7° C. and then dropped to 4° C. After 30 minutes of the hydrogen chloride passage, the cooling ice-bath was removed, the mixture was filtered, and the filtrate was concentrated in vacuo to give an oily solid, crude 4,5-bis(p-methoxyphenyl) - 2 - phenyl-3-(chloromethyl)furan.

The thus-prepared 4,5-bis(p-methoxyphenyl)-2-phenyl-3-(chloromethyl)furan, 20 ml. of dimethylformamide and 1.3 g. of potassium cyanide was stirred at room temperature for 20 hours, then heated to 40–50° C. for 7 hours, and then allowed to stand for 3 days at room temperature (23–25° C.). The reaction mixture was concentrated in vacuo to yield 7 g. of oil. This oil was chromatographed over 700 g. of silica gel in a column, using methylene chloride as eluant. A total of 19 fractions (each 175 ml.) of methylene chloride were collected. Fractions 12 to 14 were combined and evaporated, and the residue of 1.7 g. was recrystallized from 3 ml. of acetonitrile to give one gram of 4,5-bis(p-methoxyphenyl) - 2 - phenylfuran-3-acetonitrile of M.P. 153 to 154° C.

*Analysis.*—Calcd. for $C_{26}H_{21}NO_3$ (percent): C, 78.96; H, 5.35; N, 3.54. Found (percent): C, 78.31; H, 5.22; N, 3.69.

EXAMPLE 16

2,4,5-tri(p-anisyl)furan-3-acetonitrile (a) 1,2,4-tri(p-anisyl)-1,4-butanedione: A mixture of 6.4 g. (0.023 mole) of anisoin, 3.75 g. (0.025 mole) of p-methoxyacetophenone and 0.4 g. of powdered potassium hydroxide was heated at 165–195° C. for 1 hr. The reaction mixture was cooled; 100 ml. of water and 100 ml. of methylene chloride were added. The mixture was stirred and the organic layer was separated. The organic layer was washed with saturated sodium chloride solution, dried and concentrated in vacuo. The residue was crystallized from ethanol to give 7 g. of 1,2,4 - tri(p-anisyl)-1,4-butanedione which after recrystallization from acetone melted at 140.5–141° C.

*Analysis.*—Calcd. for $C_{25}H_{24}O_5$ (percent): C, 74.24; H, 5.98. Found (percent): C, 74.07; H, 6.22.

(b) 2,3,5-tri(p-anisyl)furan: To 25 g. (0.062 mole) of 1,2,4-tri(p-anisyl)-1,4-butanedione was added 50 ml. of concentrated sulfuric acid. The dark reaction mixture was stirred for 10 minutes and poured into 600 ml. of ice-water. Ether was added and the mixture was filtered. The ether layer of the filtrate was separated, dried and concentrated in vacuo to give about 6 g. of solid residue. This solid was recrystallized from isopropanol to give 4.6 g. (19%) of 2,3,5-tri(p-anisyl)furan of M.P. 113–114° C.

*Analysis.*—Calcd. for $C_{25}H_{22}O_4$ (percent): C, 77.70; H, 5.74. Found (percent): C, 77.45; H, 5.63.

(c) 2,4,5-tri(p-methoxyphenyl)furan - 3 - acetonitrile: In the manner given in Example 15(b), 2,3,5 - tri(p-anisyl)furan was treated with paraformaldehyde and hydrogen chloride in the presence of zinc chloride to give the corresponding 2,4,5 - tri(p - anisyl) - 3 - (chloromethyl)furan. This product was thereupon heated with potassium cyanide to give 2,4,5 - tri(p - methoxyphenyl)furan - 3 - acetonitrile[2,4,5-tri(p-anisyl)furan-3-acetonitrile].

EXAMPLE 17

4,5-bis(p-chlorophenyl) - 2 - phenylfuran-3-acetonitrile

In the manner given in Example 15(b), 2,3-bis(p-chloropheny)-5-phenylfuran (German Pat. 1,105,714) was chloromethylated with paraformaldehyde and hydrogen chloride in the presence of zinc chloride and the resulting product was treated with potassium cyanide to give 4,5-bis(p-chlorophenyl)-2-phenylfuran-3-acetonitrile.

EXAMPLE 18

2,4,5-triphenylthiophene-3-acetonitrile

In the manner given in Example 15(b), 2,3,5-triphenylthiophene was treated with paraformaldehyde and hydrogen chloride in the presence of zinc chloride to give 2,4,5-triphenyl-3-(chloromethyl)thiophene, which was treated with potassium cyanide to give 2,4,5-triphenylthiophene-3-acetonitrile.

EXAMPLE 19

4,5-diphenyl-2-(p-tolyl)thiophene-3-acetonitrile

In the manner given in Example 15(b), 2,3-diphenyl-5-(p-tolyl)thiophene (German Pat. 1,105,714) was chloromethylated with paraformaldehyde and hydrogen chloride in the presence of zinc chloride to give 4,5-diphenyl-2-(p-tolyl)-3-(chloromethyl)thiophene. This product was treated with potassium cyanide in acetonitrile solution to give 4,5-diphenyl-2-(p-tolyl)thiophene-3-acetonitrile.

In the manner given in the prior examples other 2,3,5-triphenyl (and substituted phenyl) pyrroles, -furans and -thiophenes can be converted to the corresponding 2,4,5-triphenyl (and substituted phenyl)pyrrole (furan or thiophene)-3-acetonitriles. Representative compounds thus obtained include:

2,4,5-tri(p-methoxyphenyl)pyrrole-3-acetonitrile;
4,5-bis(o-bromophenyl)-2-phenylpyrrole-3-acetonitrile
4,5-bis(p-iodophenyl)-2-(p-ethoxyphenyl)pyrrole-3-acetonitrile;
4,5-bis(p-isopropylphenyl)-2-(p-bromophenylpyrrole-3-acetonitrile;
4,5-bis(p-propoxyphenyl)-2-(p-butylphenyl)pyrrole-3-acetonitrile;
4,5-bis(m-ethylphenyl)-2-(m-trifluoromethylphenyl)pyrrole-3-acetonitrile;
4,5-bis(o-ethylphenyl)-2-(p-ethoxyphenyl)pyrrole-3-acetonitrile;
4-(o-ethylphenyl)-5-(m-butylphenyl)-2-phenylpyrrole-3-acetonitrile;
1-methyl-4-(o-butylphenyl)-5-(o-ethylphenyl)-2-(o-tolyl)pyrrole-3-acetonitrile;
1-methyl-4,5-bis(m-iodophenyl)-2-(m-propylphenyl)pyrrole-3-acetonitrile;
4,5-bis(p-trifluoromethylphenyl)-2-phenylpyrrole-3-acetonitrile;
2,4,5-triphenylfuran-3-acetonitrile;
4,5-bis(o-bromophenyl)-2-phenylfuran-3-acetonitrile;
4,5-bis(p-iodophenyl)-2-(p-ethoxyphenyl)furan-3-acetonitrile;
4,5-bis(p-isopropylphenyl)-2-(p-bromophenylfuran-3-acetonitrile;
4,5-bis(p-propoxyphenyl)-2-(p-butylphenyl)furan-3-acetonitrile;
4,5-bis(m-ethylphenyl)-2-(m-trifluoromethylphenyl)furan-3-acetonitrile;
4,5-bis(o-ethylphenyl)-2-(p-ethoxyphenyl)furan-3-acetonitrile;
4-(o-ethylphenyl)-5-(m-butylphenyl)-2-phenylfuran-3-acetonitrile;
4,5-bis(o-bromophenyl)-2-phenylthiophene-3-acetonitrile;
4,5-bis(p-iodophenyl)-2-(p-ethoxyphenyl)thiophene-3-acetonitrile;
4,5-bis(p-isopropylphenyl)-2-(p-bromophenyl)thiophene-3-acetonitrile;
4,5-bis(p-propoxyphenyl)-2-(p-butylphenyl)thiophene-3-acetonitrile;
4,5-bis(m-ethylphenyl)-2-(m-trifluoromethylphenyl)thiophene-3-acetonitrile;

4,5-bis(o-ethylphenyl)-2-(p-ethoxyphenyl)thiophene-3-acetonitrile;

4-(o-ethylphenyl)-5-(m-butylphenyl)-2-phenylthiophene-3-acetonitrile, and the like.

I claim:

1. A compound of the formula:

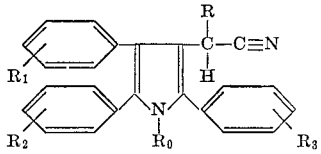

wherein $R_0$ and $R$ are selected from the group consisting of hydrogen and methyl; and wherein $R_1$, $R_2$ and $R_3$ are selected from the group consisting of hydrogen, alkyl and alkoxy having from 1 to 4 carbon atoms, inclusive, halogen and —$CF_3$.

2. A compound according to claim 1 wherein R, $R_1$, $R_2$, $R_3$ and $R_0$ are hydrogen and which is therefore 2,4,5-triphenylpyrrole-3-acetonitrile.

3. A compound according to claim 1 wherein $R_1$ and $R_2$ are p-methoxy, R, $R_0$ and $R_3$ are hydrogen and which is therefore 4,5 - bis(p-methoxyphenyl)-2-phenylpyrrole-3-acetonitrile.

4. A compound according to claim 1 wherein $R_1$ and $R_2$ are p-methoxy, $R_0$ is methyl, R and $R_3$ are hydrogen and which is therefore 1-methyl-4,5-bis(p-methoxyphenyl)-2-phenylpyrrole-3-acetonitrile.

5. A compound according to claim 1 wherein $R_1$, $R_2$ and $R_3$ are p-methoxy, $R_0$ and R are hydrogen and which is therefore 2,4,5 - tri(p-methoxyphenyl)pyrrole-3-acetonitrile.

References Cited

UNITED STATES PATENTS 3,392,833   9/1967   Fremery _____ 260—326.62

ALEX MAZEL, Primary Examiner

B. I. DENTZ, Assistant Examiner

U.S. Cl. X.R.

260—326.62, 329, 332.3, 332.5, 346.1, 347.8; 424—274, 275, 285

UNITED STATES PATENT OFFICE
CERTIFICATE OF CORRECTION

Patent No. 3,531,497     Dated September 29, 1970

Inventor(s) Gilbert A. Young

It is certified that error appears in the above-identified patent and that said Letters Patent are hereby corrected as shown below:

Column 1, Formula I, for "C=N" read -- C≡N --. Column 2, line 60, for "of phosphorus" read -- or phosphorus --. Column 3, line 10, for "fluorine" read -- fluorine, --. Column 5, line 55, for "Powers" read -- Powders --. Column 7, line 29, for "of ethylene" read -- of ethyl --. Column 8, line 47, for "S1, sh" read -- sl sh --; line 65, for "S1. sh" read -- sl sh --. Column 11, line 34, for "tolyl)-[(" read -- tolyl)-3-[( --; line 74, for "methyl]4,5-" read -- methyl]-4,5- --. Column 12, line 74, for "iodophenyl-3-" read -- iodophenyl)-3- --. Column 13, line 58, for "-3-[dimethylamino" read -- -3-[(dimethylamino --. Column 13, line 60, delete. Column 15, line 3, for "-4-(m-methoxyphenyl" read -- -4-(m-ethoxyphenyl --. Column 16, line 19, for "(0.12) mole)" read -- (0.12 mole) --. Column 17, line 38, for "(0.023" read -- (0.0235 --; line 75, for "ropheny" read -- ropheny1 --. Column 18, line 36, for "bromophenyl" read -- bromophenyl) --; line 56, for "bromophenyl" read -- bromophenyl) --.

Signed and sealed this 16th day of November 1971.

(SEAL)
Attest:

EDWARD M. FLETCHER, JR.
Attesting Officer

ROBERT GOTTSCHALK
Acting Commissioner of Patents